US012456081B2

(12) United States Patent  
Dalley, Jr. et al.

(10) Patent No.: US 12,456,081 B2  
(45) Date of Patent: Oct. 28, 2025

(54) SYSTEMS AND METHODS FOR INCREASED CORRECTIONAL FACILITY SAFETY

(71) Applicant: Codex Corporation, Maple Grove, MN (US)

(72) Inventors: Kenneth L. Dalley, Jr., Maple Grove, MN (US); Andrew Shaw, Eagan, MN (US); Gareth Miller, Roseville, MN (US); Adithi Deborah Chakravarthy, Omaha, NE (US)

(73) Assignee: Codex Corporation, Maple Grove, MN (US)

( * ) Notice: Subject to any disclaimer, the term of this patent is extended or adjusted under 35 U.S.C. 154(b) by 215 days.

(21) Appl. No.: 18/136,050

(22) Filed: Apr. 18, 2023

(65) Prior Publication Data

US 2023/0334389 A1    Oct. 19, 2023

Related U.S. Application Data

(60) Provisional application No. 63/331,994, filed on Apr. 18, 2022.

(51) Int. Cl.
*G06Q 10/06* (2023.01)
*G06Q 10/0631* (2023.01)
*G06Q 10/0639* (2023.01)
*G06Q 50/26* (2012.01)

(52) U.S. Cl.
CPC ......... *G06Q 10/063116* (2013.01); *G06Q 10/06398* (2013.01); *G06Q 50/265* (2013.01)

(58) Field of Classification Search
CPC .......................................... G06Q 10/00–90/00
See application file for complete search history.

(56) References Cited

U.S. PATENT DOCUMENTS

| | | | |
|---|---|---|---|
| 2008/0140828 A1* | 6/2008 | Kalinski | G07C 9/27 709/224 |
| 2013/0226644 A1* | 8/2013 | Alonso | G06Q 50/163 705/7.17 |
| 2014/0313031 A1* | 10/2014 | Gupta | G07C 1/20 340/539.13 |
| 2015/0367513 A1* | 12/2015 | Gettings | G05D 1/0212 700/248 |
| 2020/0053324 A1* | 2/2020 | Deyle | G01C 21/20 |

* cited by examiner

*Primary Examiner* — Arif Ullah
(74) *Attorney, Agent, or Firm* — Schwegman Lundberg & Woessner, P.A.

(57) ABSTRACT

Various embodiments monitor compliance with standards for conducting rounds within corrections facilities and assist in maintaining safe corrections facilities by identifying predictable rounds patterns and encouraging inmate monitoring through unpredictable rounds timing. Some embodiments generate scores indicative of randomness in conducting rounds by individuals, groups, and even an entire staff of corrections officers.

20 Claims, 5 Drawing Sheets

SYSTEMS AND METHODS FOR INCREASED CORRECTIONAL FACILITY SAFETY

PRIORITY APPLICATIONS

This application claims the benefit of priority to U.S. Provisional Application Ser. No. 63/331,994, filed Apr. 28, 2022, the content of which is incorporated herein by reference in its entirety.

BACKGROUND

Correctional facilities, such as jails and prisons, can present many risks for corrections officers and other staff members, visitors, and inmates. These risks are mitigated through supervision. However, constant supervision of all inmates is rarely feasible. Thus, best practices, policies, regulations, and even law can set standards for frequency of rounds performed by corrections officers. For example, a corrections officer on duty assigned to a particular cell block may be required to perform rounds and visually inspect certain areas or to visually check on each inmate once every hour. While this may be the requirement, the goal of safety for all may not be fully met by simple compliance with a one-dimensional metric.

SUMMARY

Various embodiments herein not only monitor compliance with standards for conducting rounds within correctional facilities, but assist in maintaining safe correctional facilities by identifying predictable rounds patterns and encouraging inmate monitoring through unpredictable rounds timing.

In some aspects, the techniques described herein relate to a method including: retrieving, from a database, rounds data for a given period, the rounds data indicating a presence of a staff member at a date and time at particular facility locations or in the presence of one or more individuals; grouping retrieved rounds data by a discrete time dimension with each dimension representing an equal period; filtering the grouped rounds data by each of at least one location, a date range, and at least one staff member; calculating a mean occurrence of rounds across all discrete time dimensions; calculating a rounds occurrence count for each discrete time dimension; calculating a distance from the mean for each discrete time dimension based on the calculated mean and the calculated rounds occurrence counts for each discrete time dimension; subtracting each calculated distance from 1 to obtain a difference for each discrete time dimension; dividing the respective differences by a desired dispersion of the rounds data to obtain a quotient for each discrete time dimension; calculating a dispersion score by multiplying a sum of all of the quotients by 100, the dispersion score representative of rounds dispersion equality across the discrete time dimension by the at least one staff member; and outputting the dispersion score for presentation within a user interface.

In some aspects, the techniques described herein relate to a system including: a network interface; a database; a computer processor; a memory device storing instructions executable by the computer processor to perform data processing activities including: retrieving, from the database, rounds data for a given period, the rounds data indicating a presence of a staff member at a date and time at particular facility locations or in the presence of one or more individuals; grouping retrieved rounds data by a discrete time dimension with each dimension representing an equal period; filtering the grouped rounds data by each of at least one location, a date range, and at least one staff member; calculating a mean occurrence of rounds across all discrete time dimensions; calculating a rounds occurrence count for each discrete time dimension; calculating a distance from the mean for each discrete time dimension based on the calculated mean and the calculated rounds occurrence counts for each discrete time dimension; subtracting each calculated distance from 1 to obtain a difference for each discrete time dimension; dividing the respective differences by a desired dispersion of the rounds data to obtain a quotient for each discrete time dimension; calculating a dispersion score by multiplying a sum of all of the quotients by 100, the dispersion score representative of rounds dispersion equality across the discrete time dimension by the at least one staff member; and outputting, via the network interface device, the dispersion score for presentation within a user interface.

DETAILED DESCRIPTION

Figure 1:
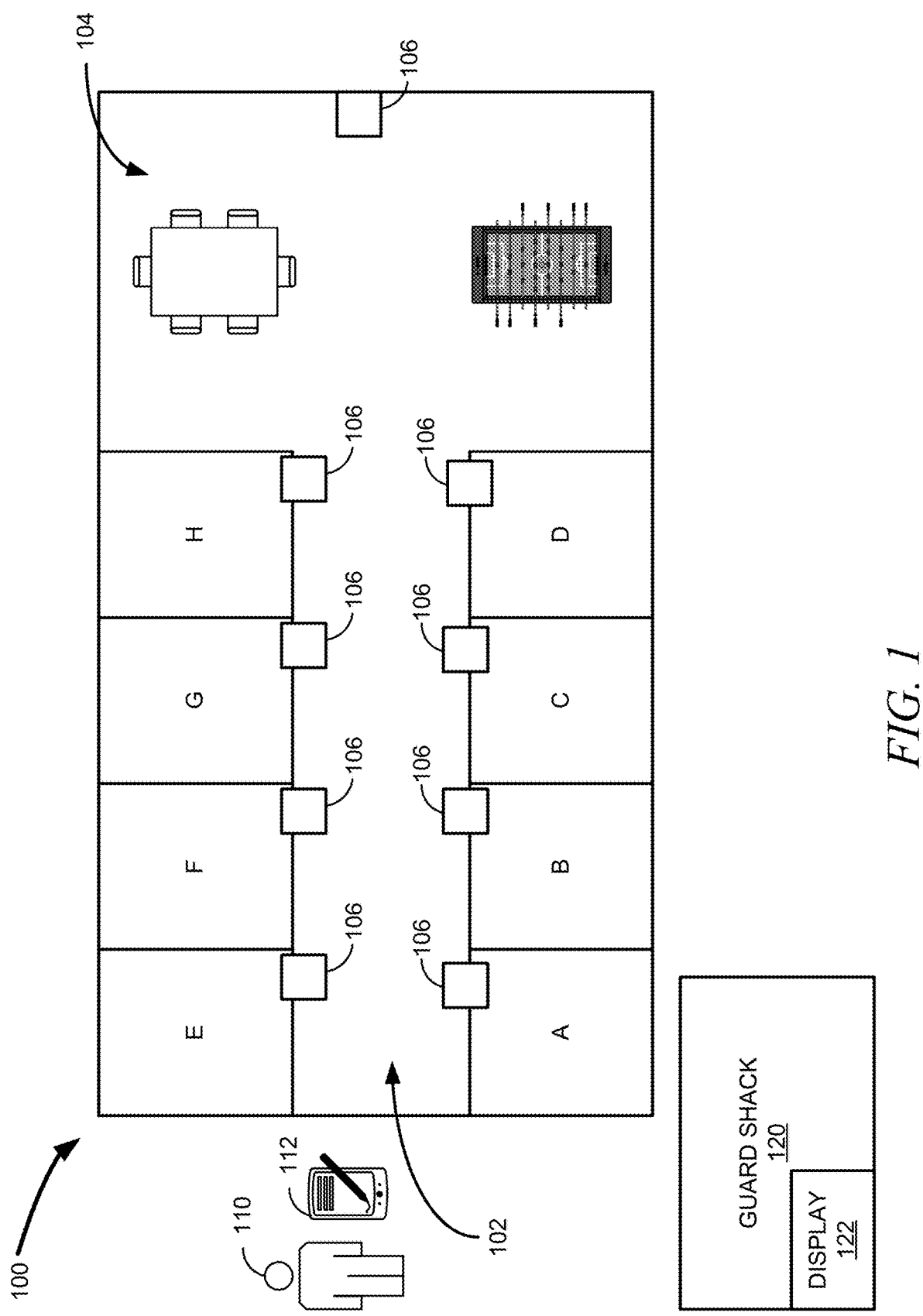
FIG. 1 is a logical block diagram of a cell block, according to an example embodiment.

Corrections agencies strive to quantify the performance of their staff members, especially when it comes to tasks aimed at inmate welfare and safety for all.

A well-being check, also known as a round, is a procedure in which a corrections officer staff member walks by a confined person and makes visual contact to ensure well-being. Corrections officer or other staff members are required to log their rounds for compliance monitoring and possible future use in court, which serves as a body of evidence that proves no officer is deliberately indifferent toward any inmate that may commit an illicit act, such as violence or self-destruction.

Frequent rounds are a requirement that every corrections facility in the United States imposes on its officers, by policy, best practices, regulations, statute, common law duty of care, and the like. The frequency of these rounds varies based on multiple factors, including facility layout, inmate classification, inmate risk status, control agency, and leadership preference. For example, a prison may assign a 30-minute round requirement on lock-down housing units containing inmates on suicide-watch, while work release dormitories are assigned a 60-minute requirement.

When a corrections facility is audited by a government body, supervisory staff at the facility are asked to produce a compliance report. This compliance report is a summary of their rounds over a given date range. These reports usually list all of the times officers were late on rounds, and also appends notes justifying the late rounds.

A legally defensible compliance report will prove that staff are not deliberately indifferent, but it does not necessarily limit the inmate's window of opportunity to commit acts of violence or self-destruction. On the contrary, a routine schedule of rounds often serves to define a window of opportunity for inmates. For example, an inmate worker in a large dormitory may notice a 60-minute pattern of officer presence, which allows that inmate to plan an illicit activity that lasts no more than 59 minutes. Or an officer may perform a round at the end of one hour and then immediately perform a round at the beginning of the next hour. The result is nearly a two-hour window within which nefarious activities may be conducted The various embodiments herein include an analytical tool that collects rounds data, predicts patterns, and may prescribe corrective action. The tools of such embodiments aim to assist in preventing inmates from discovering patterns of behavior in officer rounds.

In such embodiments, There may be one, two, or three general elements: data collection, analysis, and notification.

Data Collection Element

In some embodiments, corrections agencies will log their rounds electronically using a ruggedized mobile device. This mobile devices may scans wall mounted integrated chips on a wide range of radio frequencies, such as radio frequency identification (RFID) chips. In some embodiments, RFID chips worn or carried by inmate may instead or additionally be scanned. This logging process documents each instance of visual contact, or at least presence of, one or both of a corrections officer and an inmate, in a certain location. The log in such embodiments may contain the variables: timestamp, officer identity, inmate identity, and location. In some embodiments, inmate identities may be aggregated, in housing units containing multiple inmates, if and when inmate location.

Analysis Element

The analysis element, in some embodiments, is built upon an algorithm that can identify and predict behavioral patterns in correctional officers conducting rounds. The algorithm when executed by a computer outputs a single score indicative or randomness of rounds being performed by one or more corrections officers considered by the algorithm. This score is a function of numerous behavioral data inputs related to officer rounds. The score aggregates multiple measures, however, the weight of each measure in some embodiments is not a parameter that a government agency or correctional facility can configure.

In some embodiments, the measures may include one or more of a distance deviation and minute and hour concentrations.

A Distance Deviation is a mathematical formula that quantifies the variation of a set of data values, where the data values are themselves a running calculation of minutes between rounds. Data values may be filtered by a single location or groups of locations, a given date range, a single staff member or team of staff members, and only on-time rounds. Distance Deviation, as a stand-alone data visualization, is most practically displayed for correctional agencies in the form of a bell curve with 1-minute bins. Distance Deviation, as a simple function, outputs a decimal. This decimal represents the dispersion of the dataset relative to its mean. This decimal is then divided by the optimal dispersion for the same dataset. The final result is a decimal less than 1.

A Minute Concentration is a mathematical formula that counts every instance of a round, grouped by 60 discrete dimensions, each dimension representing a minute on the clock. Data values may be filtered by a single location or a group of locations, a given date range, a single staff member or groups of staff members, and only on-time rounds. A running calculation of percentage-of-total is then applied to all 60 groups. Distance Deviation as a stand-alone data visualization is most practically displayed for correctional agencies in the form of a table with max-to-min conditional formatting. Minute Concentration, as a simple function is the maximum value in the 60 groups, and outputs a decimal less than 0. This decimal represents the highest concentration of rounds on a specific minute past the hour. This decimal is then subtracted from 1, the total of which is divided by 0.9833 (i.e., the quotient of one divided by 60). The final result is a decimal less than 1.

An Hour Concentration is a mathematical formula, similar to a Minute Concentration but where the data values are grouped by 12 or 24 discrete dimensions, each representing an hour of the day. All other variables equal this metric represents the highest concentration of rounds on a specific hour of the day in a given date range. The final result is a decimal less than 1.

Notification Element

The notification element, in various embodiments, may take different and combined forms. For example, in some embodiments a score may be output and presented on a display in a guard shack, on a mobile device of a subject corrections officer, or other location. Other embodiments may include push notifications to mobile devices with suggestions of prescriptive measures to prevent officers from following predictable patterns throughout their day-to-day responsibilities. In such embodiments, an algorithm identifies or predicts behavioral patterns based on real-time data collected by officers throughout the day. This algorithm may then output a set of time frames in which officers are either a) urged to refrain from certain activities, or b) urged to engage in certain activities, such as do not do you next round at 15 minutes past the hour, wait until 23 minutes past the hour.

Such messages, may be transmitted to corrections officers with vibratory notification in some embodiments to avoid alerting inmates to the advanced corrections officer analytics and messaging transpiring in the background.

In these and some other embodiments, a large screen dashboard in a location viewable to corrections officers may displays statistics related to rounds. The statistics can be any of the measures herein or otherwise contribute to scoring. The goal with such a display in these embodiments is gamification. Supervisory staff may display statistics at their own discretion to bolster staff morale and allow staff to compare their performance to that of their peers.

These and other embodiments are described in greater detail herein with reference to the figures.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is a logical block diagram of a cell block 100, according to an example embodiment. The cell block 100 includes a cells A-H separated by a hall 102 leading to a common area 104. There are various corrections officer 110 check-in points 106. The check-in points 106 are locations where the corrections officer 110 performs an action to log physical presence at the location of the particular check-in point 106. The action taken at a check-in point 106 is performed with a handheld device 112.

The handheld device 112, in some embodiments, may be a wand in some embodiments that is placed in contact with a check-in point 106 and that check-in point 106 sends a message over a computer network logging the presence, date, and time of the particular handheld device 112 at the location of that check-in point 106.

In other embodiments, the handheld device 112 may be a smart device, such as a table, smartphone, handheld computer, and the like. The handheld device 112 in such embodiments includes at least one element integrated therein that receives an input from the check-in point 106, such as an RFID scanner or camera within the handheld device 112 that captures a unique input from an RFID tag or barcode of a check-in point 106. In such embodiments, the handheld device 112 transmits data via a wireless network to computer that logs data of the corrections officer being located at a scanned check-in point 106.

In some of these and additional embodiments, the handheld device 112 may also scan barcodes or RFID tags associated with other things, such as tools or inmates. Such embodiments enable logging direct interaction with specific people and items. In some embodiments, additional inputs may be provided by the corrections officer 110 into the handheld device 112 through selections of particular items or words presented in a user interface of the handheld device 112.

Similarly, in the event a scanning device of the handheld device 112 is not working or if a check-in point 106 is not functioning properly, items may be searched and selected on the handheld device 112 in some embodiments to provide the input indicative of the corrections officer 110 presence at the particular location or in the presence of a particular item. Note however that this functionality may be disabled or limited in some implementations or in some situations where compliance with every round is critical for inmate and corrections officer 110 safety, concerns of staff of skipping actual rounds by simply inputting false data, and the like. However, some embodiments may trigger alerts from the handheld device 112 when manual rounds data is input to enable supervisor verification of the technical issue and to notify maintenance personnel to repair the issue.

The cell block 100 also includes a guard shack 120. Within the guard shack 120 is a display 122. The display 122, in some embodiments, is utilized to present data gathered and derived from rounds data related to the corrections officer 110 and other corrections officers presence at the check-in points over time. The display 122 may present graphics indicative of rounds randomness overtime thereby preventing or at least limiting inmates from identifying patterns of behavior related to round timing. Some embodiments may include presenting a score, a graph, or both with regard to individual corrections officers, aggregated data for entire shifts, or for multiple shifts. Such presentations of data are useful in ensuring compliance with policies, laws, regulations, and the like applicable to operating corrections facilities. Further, presentation of the data enables gamification and possible competitive drive of corrections officers to get a high score, an optimal graph, to do better than a teammate, one shift outperforming another, one cell block team of corrections officers out performing another cell block team of corrections officers. Regardless of what competition may be induced through such embodiments, the goal is first and foremost to increase safety for all stakeholders, inmates, corrections officers, visitors, maintenance, and others alike.

Figure 2:
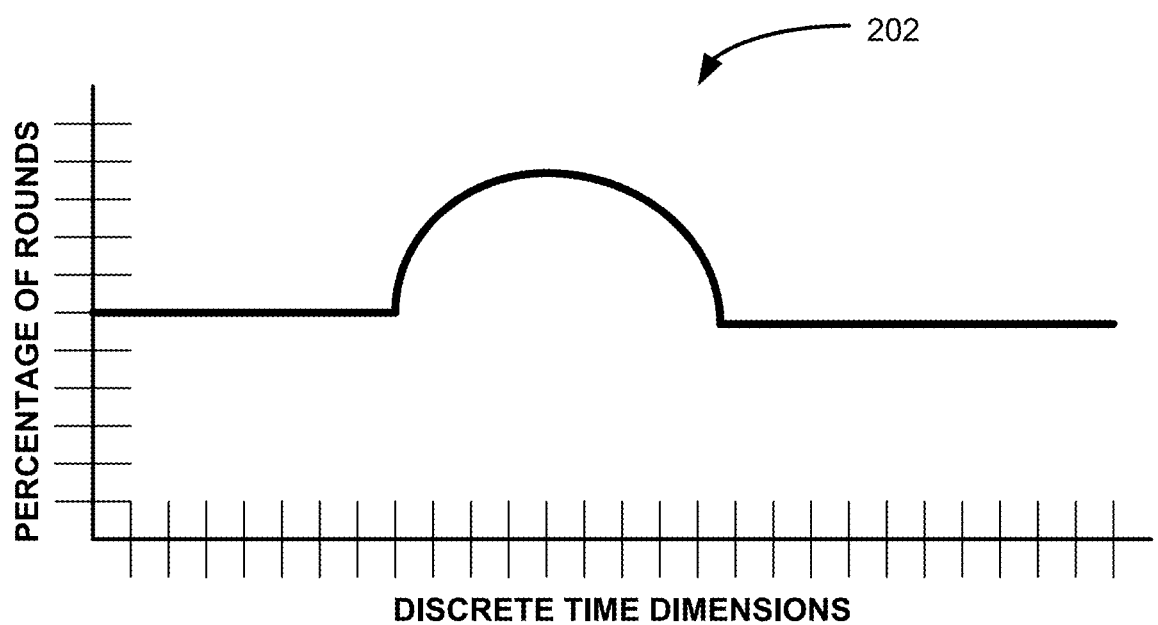
FIG. 2 include two line graphs, according to example embodiments.
Figure 2:
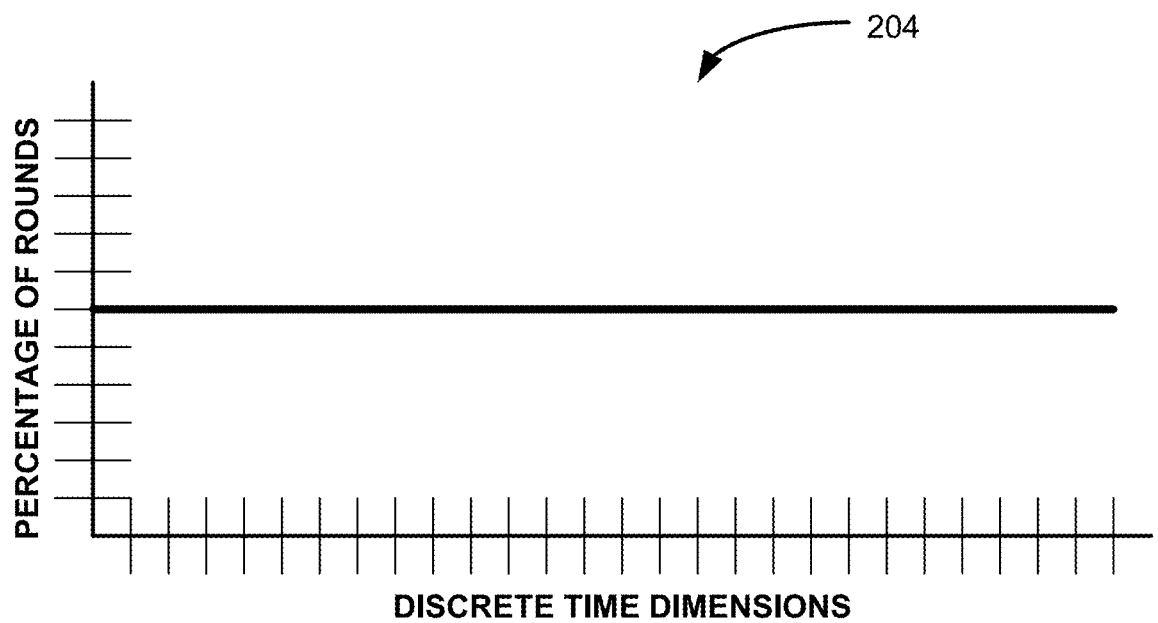

FIG. 2 include two line graphs 202, 204, according to example embodiments. The line graphs 202, 204 are examples of what may be presented on the display 122 in the guard shack 120 of FIG. 1. Both line graphs 202, 204 include a horizontal axis of discrete time dimensions and a vertical axis providing some sort of measure of rounds, which could be actual count, average count over a number of days, a percentage of all rounds, and the like. As illustrated, the line graphs 202, 204 provide a percentage of all rounds for a given period, such as rounds performed over the past week.

The line graph 202 shows higher percentages of rounds at the elevated bump in the middle of the graph. This indicates more rounds have been performed during this time. This may be desirable in some instances depending on the area being monitored, such as a chow hall during mealtime or a work area when inmates are present if the discrete time dimensions are for an entire data. However, if this is a cell block that is always populated, the higher percentage of rounds during the identified period can show less randomness and enable inmates to detect patterns in conducting rounds, such as when the discrete time periods are the minutes of an hour and the vertical axis represents rounds performed at times within hours aggregated over a period, such as a week. This pattern shown in the line graph 202 shows that a round is more likely to be conducted during the middle period, such as at every half hour and less likely at all other points within an hour. Conversely, the line graph 204 illustrates a graph that may be considered optimal if complete randomness or equal distribution of rounds are desired.

Figure 3:
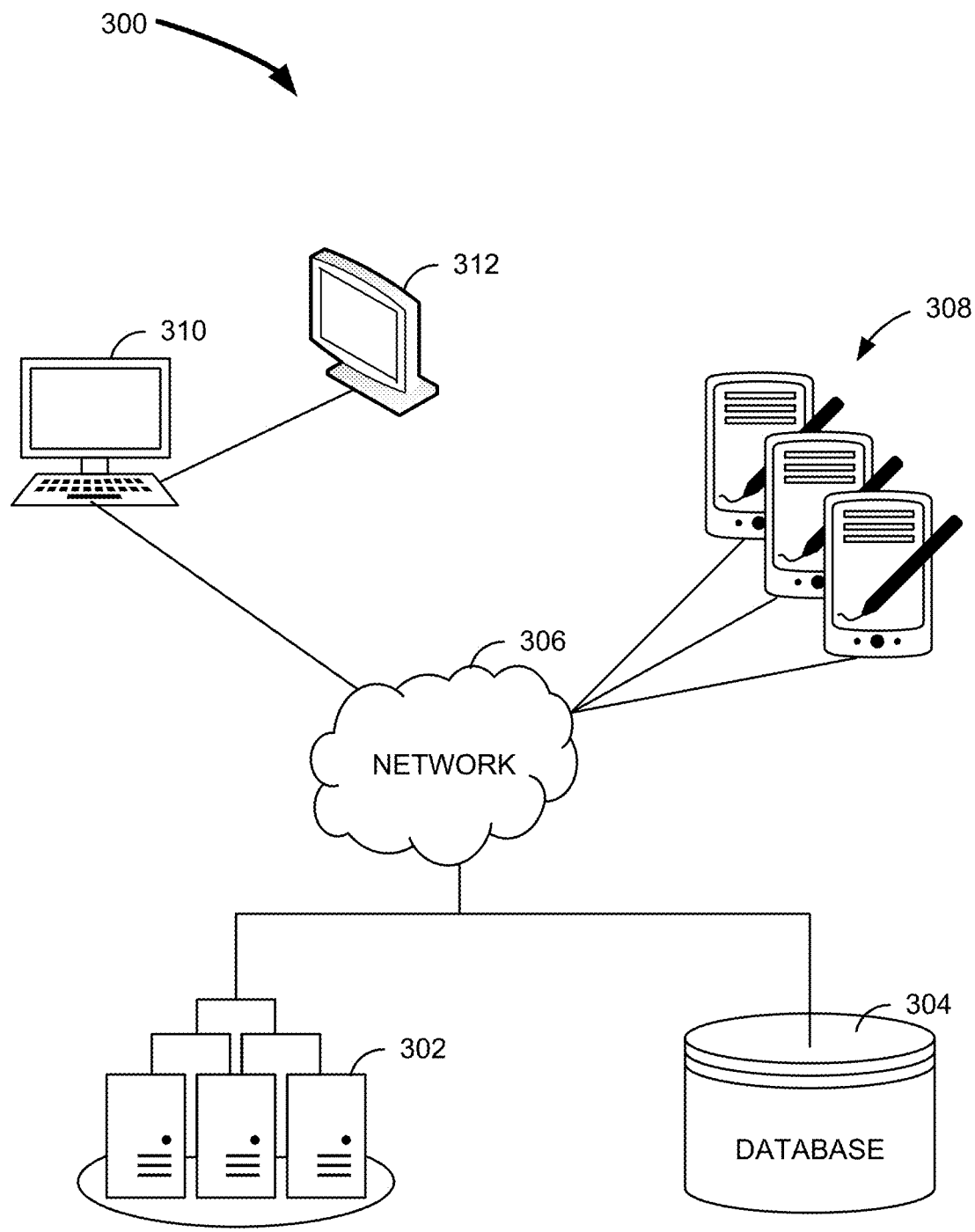
FIG. 3 is a system diagram, according to an example embodiment.

FIG. 3 is a system 300 diagram, according to an example embodiment. The system 300 is an example of a networked computing environment on which some embodiments may be implemented.

The system 300 includes one or more servers 302 on which software is deployed to perform data aggregation and processing with regard to data received from handheld devices 308 via a network and stored in a database 304. The servers 302 may process the data to identify patterns in the performance of rounds by corrections officers and communicate data representative of the patterns to handheld devices 308 of corrections officers, to supervisors, and to guard shack computers 310 which may present data or messages on a display 312. The servers 302 may also generate and send messages via the network 306 to the handheld devices 308 and guard shack computers 310 recommending when to make a next round or to forebear from performing a round and the time of an identified pattern.

Figure 4:
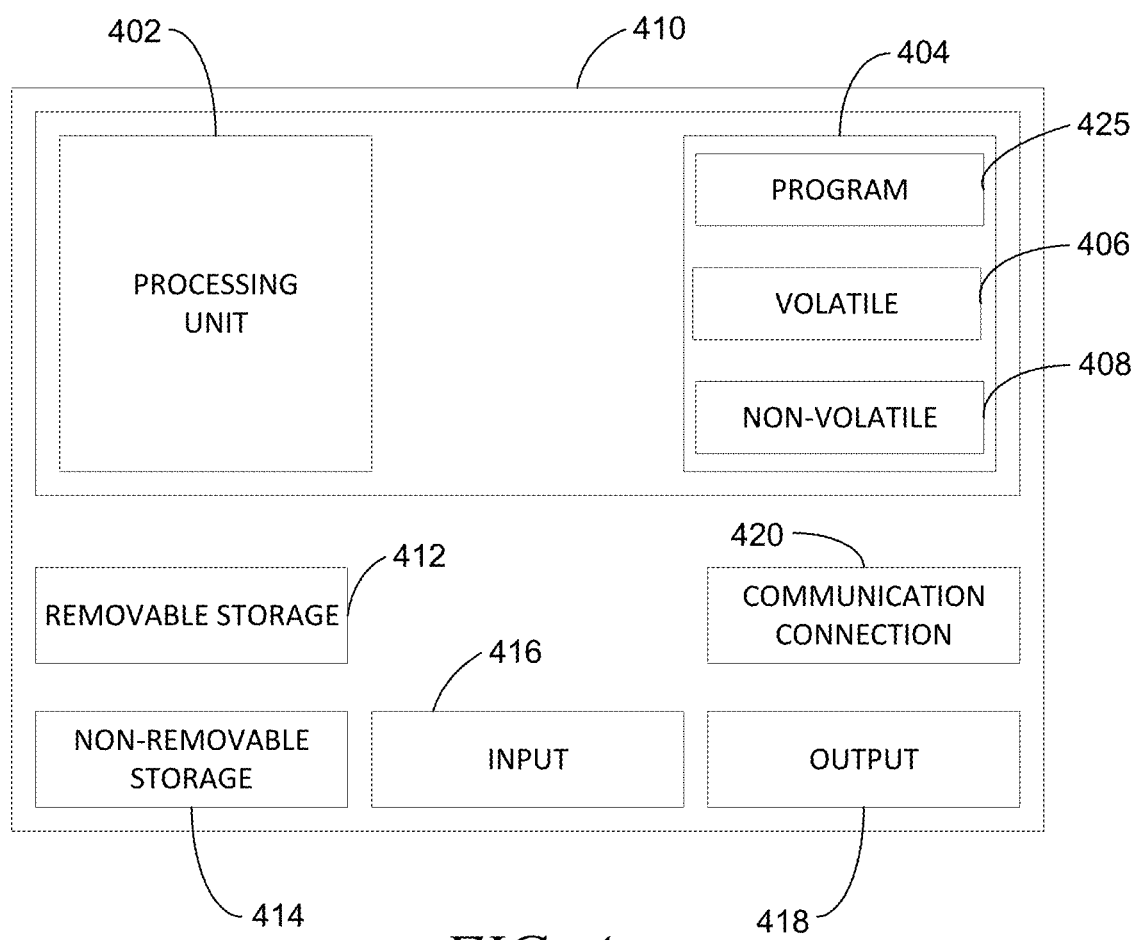
FIG. 4 is a block diagram of a computing device, according to an example embodiment.

FIG. 4 is a block diagram of a computing device, according to an example embodiment. In one embodiment, multiple such computer systems are utilized in a distributed network to implement multiple components in a transaction-based environment. An object-oriented, service-oriented, or other architecture may be used to implement such functions and communicate between the multiple systems and components. One example computing device in the form of a computer 410, may include a processing unit 402, memory 404, removable storage 412, and non-removable storage 414. Although the example computing device is illustrated and described as computer 410, the computing device may be in different forms in different embodiments. For example, the computing device may instead be a smartphone, a tablet, smartwatch, or other computing device including the same or similar elements as illustrated and described with regard to FIG. 4. Devices such as smartphones, tablets, and smartwatches are generally collectively referred to as mobile devices. Further, although the various data storage elements are illustrated as part of the computer 410, the storage may also or alternatively include cloud-based storage accessible via a network, such as the Internet.

Returning to the computer 410, memory 404 may include volatile memory 406 and non-volatile memory 408. Computer 410 may include—or have access to a computing environment that includes a variety of computer-readable media, such as volatile memory 406 and non-volatile memory 408, removable storage 412 and non-removable storage 414. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 410 may include or have access to a computing environment that includes input 416, output 418, and a communication connection 420. The input 416 may include one or more of a touchscreen, touchpad, mouse, keyboard, camera, one or more device-specific buttons, one or more sensors integrated within or coupled via wired or wireless data connections to the computer 410, and other input devices. The computer 410 may operate in a networked environment using a communication connection 420 to connect to one or more remote computers, such as database servers, web servers, and other computing device. An example remote computer may include a personal computer (PC), server, router, network PC, a peer device or other common network node, or the like. The communication connection 420 may be a network interface device such as one or both of an Ethernet card and a wireless card or circuit that may be connected to a network. The network may include one or more of a Local Area Network (LAN), a Wide Area Network (WAN), the Internet, and other networks. In some embodiments, the communication connection 420 may also or alternatively include a transceiver device, such as a BLUETOOTH® device that enables the computer 410 to wirelessly receive data from and transmit data to other BLUETOOTH® devices. For example, the communication connection 420 in some embodiments may be a BLUETOOTH® connection with a wireless headset that includes a speaker and a microphone. As such in these embodiments, a BLUETOOTH® transceiver device may be the audio output device as described elsewhere herein.

Computer-readable instructions stored on a computer-readable medium are executable by the processing unit 402 of the computer 410. A hard drive (magnetic disk or solid state), CD-ROM, and RAM are some examples of articles including a non-transitory computer-readable medium. For example, various computer programs 425 or apps, such as one or more applications and modules implementing one or more of the methods illustrated and described herein or an app or application that executes on a mobile device or is accessible via a web browser, may be stored on a non-transitory computer-readable medium.

Figure 5:
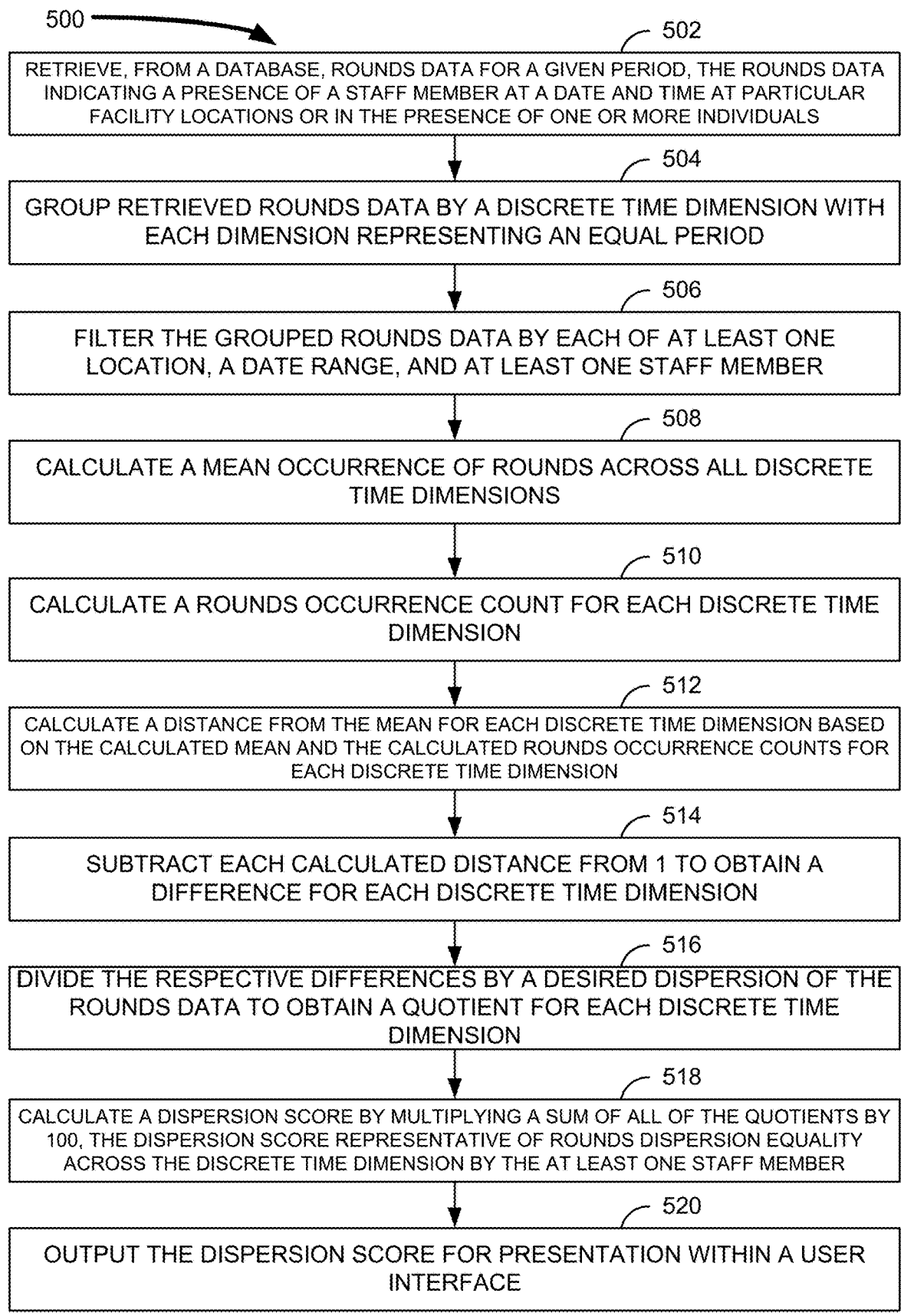
FIG. 5 is a block flow diagram of a method, according to an example embodiment.

FIG. 5 is a block flow diagram of a method 500, according to an example embodiment. The method 500 is an example of a method to generate a score indicative of timing randomness, or unpredictability, of rounds performed by corrections officers.

The method 500 includes retrieving 502, from a database, rounds data for a given period, the rounds data indicating a presence of a staff member at a date and time at particular facility locations or in the presence of one or more individuals. The method 500 then groups 504 retrieved rounds data by a discrete time dimension with each dimension representing an equal period, such as 60 dimensions for an hour or three dimensions for each 20 minute portion of an hour depending on the desired granularity of timing considered in a particular embodiment or implementation.

The method 500 continues by filtering 506 the grouped rounds data by each of at least one location, a date range, and at least one staff member. The staff member grouping may be for each staff member but may also be for an entire staff or subsets of an entire staff. Further, staff members may be considered individually and as part of one or more further groups such as to obtain and provide randomness feedback not just for individual staff members but also teams thereof.

The method 500 further processes data by calculating 508 a mean occurrence of rounds across all discrete time dimensions, calculating 510 a rounds occurrence count for each discrete time dimension, and calculating 512 a distance from the mean for each discrete time dimension based on the calculated mean and the calculated rounds occurrence counts for each discrete time dimension. Next in the method 500 is subtracting 514 each calculated distance from 1 to obtain a difference for each discrete time dimension and dividing 516 the respective differences by a desired dispersion of the rounds data to obtain a quotient for each discrete time dimension. The desired dispersion, in some embodiments, is 1−(1÷number of discrete time dimensions). For example, for 60 discrete time dimension, 1−(1÷60) =0.98333.

Subsequently, the method 500 includes calculating 518 a dispersion score by multiplying a sum of all of the quotients by 100, the dispersion score representative of rounds dispersion equality across the discrete time dimension by the at least one staff member. The method 500 then outputs 520 the dispersion score for presentation within a user interface.

In some embodiments of the method 500, the filtering 506 further includes filtering on-time rounds such that rounds data for a location with date and time data generated within less than a first duration and greater than a second duration is filtered out. The first duration may be five minutes such that two rounds completed within five minutes of each other causes one of the rounds to be disregarded. Further, the second dimension may be 60 minutes such that a round performed more than 60 minutes following the previous round is disregarded as not on time. Thus, only on-time rounds may be considered in some embodiments.

In some embodiments, the method 500 further includes generating a graphical representation based on the calculated distances and including the dispersion score and transmitting the graphical representation to a device to present within a graphical user interface.

Another embodiment of the method 500 includes generating a next round timing recommendation by identifying a discrete time dimension with a lowest rounds occurrence count and generating a round recommendation output including data representing the identified discrete time dimension with the lowest round occurrence count. In some such embodiments, the round recommendation output is transmitted to a device of the at least one staff member that generates an output communicating the round recommendation.

In some embodiments, the method 500 is performed for each staff member on a periodic basis, such as every five minutes, hourly, daily, or other period.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
   scanning, over time and by a ruggedized mobile device, wall mounted radio frequency identity (RFID) chips as the ruggedized mobile device passes the wall mounted RFID chips in a correctional facility;
   storing, in a database and by a computer remote from the ruggedized mobile device and as the ruggedized mobile device scans wall mounted RFID chips, respective log entries including a timestamp indicating a time at which the ruggedized mobile device passed a wall mounted RFID chip of the wall mounted RFID chips, an officer identity associated with the ruggedized mobile device, and a location in the correctional facility associated with the wall mounted RFID chip;
   retrieving, by a computer and from the database, rounds data, including the log entries, for a given period;
   grouping, by the computer, retrieved rounds data by a discrete time dimension with each dimension representing an equal period;
   filtering, by the computer, the grouped rounds data by each of at least one location, a date range, and the officer;
   calculating, by the computer, a mean occurrence of rounds across all discrete time dimensions;
   calculating, by the computer, a rounds occurrence count for each discrete time dimension;
   calculating, by the computer, a distance from the mean for each discrete time dimension based on the calculated mean and the calculated rounds occurrence counts for each discrete time dimension;
   subtracting, by the computer, each calculated distance from 1 to obtain a difference for each discrete time dimension;
   dividing, by the computer, the respective differences by a desired dispersion of the rounds data to obtain a quotient for each discrete time dimension;
   calculating, by the computer, a dispersion score by multiplying a sum of all of the quotients by 100, the dispersion score representative of rounds dispersion equality across the discrete time dimension by the officer;
   determining, by the computer and based on the rounds and the dispersion score, time frames in which the officer will predictably perform an activity;
   providing, by the computer and to the ruggedized mobile device, the dispersion score for presentation within a user interface of the ruggedized mobile device along with a push notification; and
   causing, by displaying the push notification on the user interface along with a corresponding vibration of the ruggedized mobile device, the officer to (i) refrain from performing the activity at the time frames and (ii) perform the activity at a different time frame.

2. The method of claim 1, wherein the filtering further includes filtering on-time rounds such that rounds data for a location with date and time data generated within less than a first duration and greater than a second duration is filtered out.

3. The method of claim 2, wherein the first duration is five minutes and the second duration is 60 minutes.

4. The method of claim 1, wherein the filtering is further performed to filter for only on-time rounds.

5. The method of claim 1, wherein there are three discrete time dimensions, a discrete time dimension for each of fifteen-minute round intervals, 30-minute round intervals, and 60-minute round intervals.

6. The method of claim 1, wherein the desired dispersion of the rounds data for each given discrete time dimension is equal to 1 divided by a number of the discrete time dimensions the retrieved rounds data is grouped into.

7. The method of claim 1, further comprising:
   generating a graphical representation based on the calculated distances and including the dispersion score; and
   transmitting the graphical representation to a device to present within a graphical user interface.

8. The method of claim 1, further comprising:
   generating a next round timing recommendation by:
   identifying a discrete time dimension with a lowest rounds occurrence count; and
   generating a round recommendation output including data representing the identified discrete time dimension with the lowest round occurrence count.

9. The method of claim 8, wherein the round recommendation output is transmitted to a device of the officer that generates an output communicating the round recommendation.

10. The method of claim 1 wherein the method is performed for each staff member on a periodic basis.

11. The method of claim 10, wherein outputting the dispersion score for presentation within a user interface is a user interface that simultaneously presents a respective dispersion score each staff member.

12. A computer-readable medium, with instructions stored thereon that when executed by a computer processor of a computing device cause the computing device to perform the method of claim 1.

13. A system comprising:
   a network interface;
   a database;
   a computer processor;

a ruggedized mobile device;

radio frequency identity (RFID) chips wall mounted in a correctional facility; and a memory device storing instructions executable by the computer processor to perform data processing activities comprising:

scanning, over time and by the ruggedized mobile device, the radio frequency identity (RFID) chips as the ruggedized mobile device passes the wall mounted RFID chips in the correctional facility;

storing, in the database and by the computer processor remote from the ruggedized mobile device and as the ruggedized mobile device scans the RFID chips, respective log entries including a timestamp indicating a time at which the ruggedized mobile device passed a RFID chip of the RFID chips, an officer identity associated with the ruggedized mobile device, and a location in the correctional facility associated with the RFID chip;

retrieving, from the database, rounds data for a given period, the rounds data, including the log entries, indicating a presence of an officer at a date and time at particular facility locations or in the presence of one or more individuals;

grouping retrieved rounds data by a discrete time dimension with each dimension representing an equal period;

filtering the grouped rounds data by each of at least one location, a date range, and the officer;

calculating a mean occurrence of rounds across all discrete time dimensions;

calculating a rounds occurrence count for each discrete time dimension;

calculating a distance from the mean for each discrete time dimension based on the calculated mean and the calculated rounds occurrence counts for each discrete time dimension;

subtracting each calculated distance from 1 to obtain a difference for each discrete time dimension;

dividing the respective differences by a desired dispersion of the rounds data to obtain a quotient for each discrete time dimension;

calculating a dispersion score by multiplying a sum of all of the quotients by 100, the dispersion score representative of rounds dispersion equality across the discrete time dimension by the officer;

determining, by the computer and based on the rounds and the dispersion score, time frames in which the officer will predictably perform an activity;

providing, by the computer processor and to the ruggedized mobile device and via the network interface device, the dispersion score for presentation within a user interface of the ruggedized mobile device along with a push notification; and causing, by displaying the push notification on the user interface along with a corresponding vibration of the ruggedized mobile device, the officer to (i) refrain from performing the activity at the time frames and (ii) perform the activity at a different time frame.

14. The system of claim 13, wherein the filtering further includes filtering on-time rounds such that rounds data for a location with date and time data generated within less than a first duration and greater than a second duration is filtered out.

15. The system of claim 14, wherein the first duration if five minutes and the second duration is 60 minutes.

16. The system of claim 13, wherein the filtering further performed to filter for only on-time rounds.

17. The system of claim 13, wherein the desired dispersion of the rounds data for each given discrete time dimension is equal to 1 divided by a number of the discrete time dimensions the retrieved rounds data is grouped into.

18. The system of claim 13, the data processing activities further comprising:

generating a graphical representation based on the calculated distances and including the dispersion score; and transmitting the graphical representation to a device to present within a graphical user interface.

19. The system of claim 13, the data processing activities further comprising:

generating a next round timing recommendation by:

identifying a discrete time dimension with a lowest rounds occurrence count; and generating a round recommendation output including data representing the identified discrete time dimension with the lowest round occurrence count.

20. The system of claim 19, wherein generating the next round recommendation further includes:

transmitting, via the network interface device, the round recommendation output to a device of the officer that generates an output communicating the round recommendation.

* * * * *